US012411991B2

(12) United States Patent
Liu et al.

(10) Patent No.: US 12,411,991 B2
(45) Date of Patent: Sep. 9, 2025

(54) CAMOUFLAGED APP WITHIN INTERACTIVE WEB-BROWSER AND METHOD FOR CONCEALING AND REVEALING THE SAME

(71) Applicant: HYTTO PTE. LTD., Singapore (SG)

(72) Inventors: Dan Liu, Guangdong (CN); Jilin Qiu, Guangdong (CN)

(73) Assignee: HYTTO PTE. LTD., Singapore (SG)

(*) Notice: Subject to any disclaimer, the term of this patent is extended or adjusted under 35 U.S.C. 154(b) by 317 days.

(21) Appl. No.: 18/069,194

(22) Filed: Dec. 20, 2022

(65) Prior Publication Data

US 2024/0135038 A1 Apr. 25, 2024

Related U.S. Application Data

(63) Continuation-in-part of application No. 18/048,817, filed on Oct. 21, 2022, now Pat. No. 11,943,516.

(51) Int. Cl.
*G06F 21/62* (2013.01)

(52) U.S. Cl.
CPC ........ *G06F 21/629* (2013.01); *G06F 21/6245* (2013.01)

(58) Field of Classification Search
CPC .. G06F 21/629; G06F 21/6245; A63F 13/335; A63F 13/355; H04N 21/2187; H04N 21/42203; H04N 21/44213; H04N 21/47205; H04N 21/4781; H04N 21/4788; H04N 21/8173
See application file for complete search history.

(56) References Cited

U.S. PATENT DOCUMENTS

| 9,691,429 B2 | 6/2017 | Leiberman et al. |
| 9,762,515 B1 * | 9/2017 | Olivares ............... G06Q 20/18 |

(Continued)

FOREIGN PATENT DOCUMENTS

| CN | 103778363 | 9/2015 |
| CN | 106778096 | 5/2017 |
| CN | 108268262 | 7/2018 |

OTHER PUBLICATIONS

Office Action Dated Aug. 17, 2023 for U.S. Appl. No. 18/048,817.

*Primary Examiner* — Alazar Tilahun
(74) *Attorney, Agent, or Firm* — CHAU & ASSOCIATES, LLC

(57) ABSTRACT

A method for revealing camouflaged components from an application running on a user device includes running the application on the user device, the application including a first sub-application and a second sub-application with the first sub-application being active and the second sub-application being camouflaged. The first sub-application detects a human-machine interaction. It is determined whether the detected human-machine interaction satisfies a predetermined condition. The second sub-application is activated when it is determined that the detected human-machine interaction satisfies the predetermined condition. The detected human-machine interaction is treated as a valid input for the operation of the first sub-application when it is determined that the human-machine interaction does not satisfy the predetermined condition. The second sub-application provides a first feature of a sensitive nature that is not provided by the first sub-application.

20 Claims, 16 Drawing Sheets

(56) References Cited

U.S. PATENT DOCUMENTS

| | | | |
|---|---|---|---|
| 2015/0186542 A1* | 7/2015 | Singh | G06F 16/9566 |
| | | | 715/206 |
| 2017/0076100 A1* | 3/2017 | Buddepalli | G06F 21/629 |
| 2017/0337397 A1* | 11/2017 | Tang | H04L 63/20 |
| 2018/0096113 A1* | 4/2018 | Hassan | G06F 3/04847 |
| 2018/0276306 A1* | 9/2018 | David | G06K 7/1417 |
| 2019/0166330 A1* | 5/2019 | Ma | H04L 65/403 |
| 2020/0409512 A1* | 12/2020 | Jing | G06F 3/0481 |
| 2021/0052988 A1 | 2/2021 | Fear | |
| 2022/0358234 A1* | 11/2022 | Shank | G06F 21/6218 |

* cited by examiner

CAMOUFLAGED APP WITHIN INTERACTIVE WEB-BROWSER AND METHOD FOR CONCEALING AND REVEALING THE SAME

CROSS-REFERENCE TO RELATED APPLICATION

The present application is a Continuation-in-Part of co-pending U.S. patent application Ser. No. 18/048,817, filed on Oct. 21, 2022, the contents of which is hereby incorporated by reference herein in its entirety.

TECHNICAL FIELD

The present disclosure relates to a camouflaged application and, more specifically, to a camouflaged application within an interactive web-browser and a method for concealing and revealing the same.

DISCUSSION OF THE RELATED ART

An application may be installed on a computer device such as a desktop computer, a laptop computer, a tablet computer, a smartphone, a smart television, a video game console, or the like. Commonly, an installed application leaves one or more icons on a device home screen so that the user may know the application has been installed and so the user can easily run the installed application.

It may happen, however, that a primary user of a device may wish to hide the fact that a particular application has been installed on the device from a secondary user of the device. For example, where the application involved adult content, confidential financial content, confidential health content, or some other sensitive subject matter and where the device is shared with a minor or where the primary user understands that there is a chance that a minor may come into contact with the device, the primary user may wish to hide the fact that the application is installed from the secondary user so as to prevent inadvertent access.

Solutions for hiding such applications most often involve the use of a misleading icon and/or application name, however, the possibility still exists that the application is run and its purpose revealed. Other solutions may involve the use of functionality being hidden behind a password; however, the prompting of a password may arouse the suspicion of the secondary user.

SUMMARY

A method for revealing camouflaged components from an application running on a user device includes running the application on the user device, the application including a first sub-application and a second sub-application with the first sub-application being active and the second sub-application being camouflaged. The first sub-application detects a human-machine interaction. It is determined whether the detected human-machine interaction satisfies a predetermined condition. The second sub-application is activated when it is determined that the detected human-machine interaction satisfies the predetermined condition. The detected human-machine interaction is treated as a valid input for the operation of the first sub-application when it is determined that the human-machine interaction does not satisfy the predetermined condition. The second sub-application provides a first feature of a sensitive nature that is not provided by the first sub-application.

A system for revealing camouflaged components from an application running on a user device includes a user device for running the application, the application including a first sub-application and a second sub-application with the first sub-application being active and the second sub-application being camouflaged. The first sub-application detects a human-machine interaction. It is determined whether the detected human-machine interaction satisfies a predetermined condition. The second sub-application is activated when it is determined that the detected human-machine interaction satisfies the predetermined condition. The detected human-machine interaction is treated as a valid input for the operation of the first sub-application when it is determined that the human-machine interaction does not satisfy the predetermined condition. The second sub-application provides a first feature of a sensitive nature that is not provided by the first sub-application.

A computer system includes a processor and a non-transitory, tangible, program storage medium, readable by the computer system, embodying a program of instructions executable by the processor to perform method steps for revealing camouflaged components from an application running on a user device. The method includes running the application on the user device. The application includes a first sub-application and a second sub-application with the first sub-application being active and the second sub-application being camouflaged. The first sub-application detects a human-machine interaction. It is determined whether the detected human-machine interaction satisfies a predetermined condition. The second sub-application is activated when it is determined that the detected human-machine interaction satisfies the predetermined condition. The detected human-machine interaction is treated as a valid input for the operation of the first sub-application when it is determined that the human-machine interaction does not satisfy the predetermined condition. The second sub-application provides a first feature of a sensitive nature that is not provided by the first sub-application.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
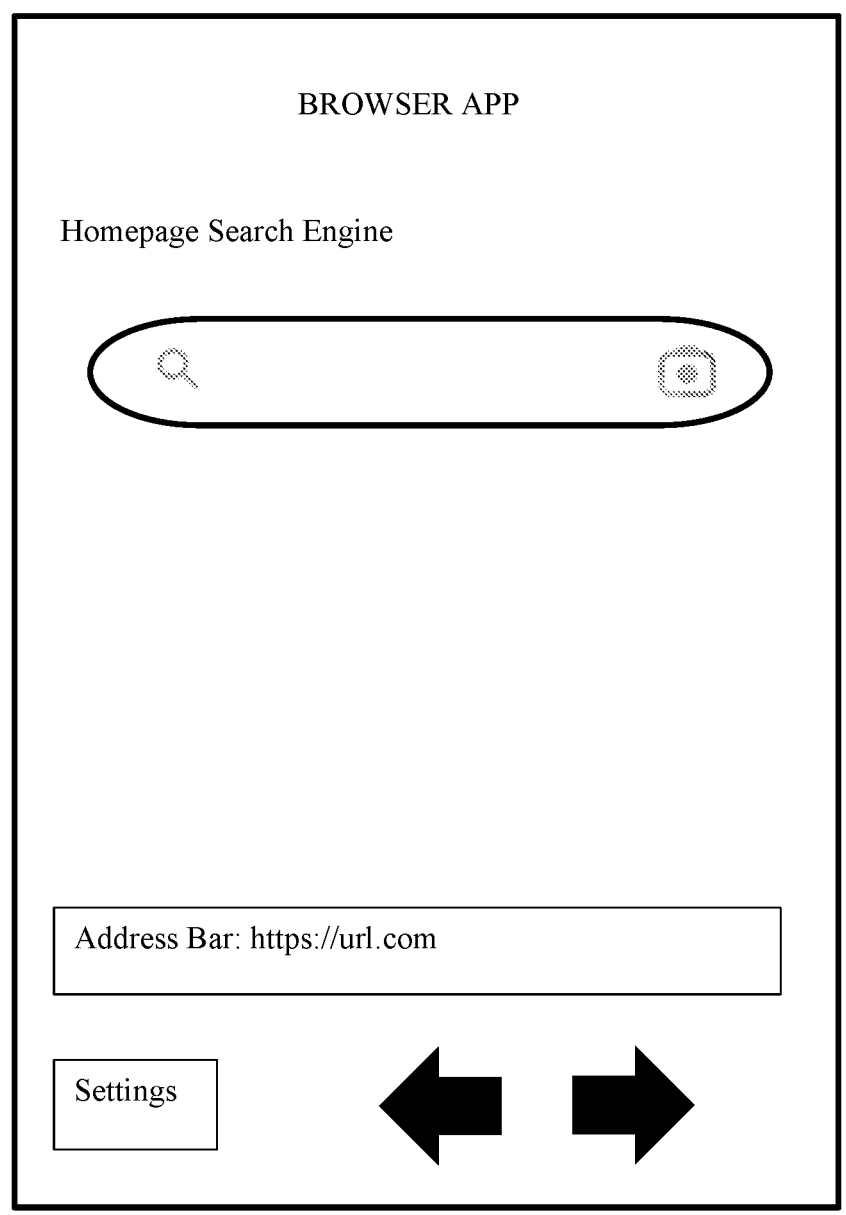
FIG. 1 is a schematic diagram illustrating an example user interface screen of a first sub-application embodied as a web browser in accordance with exemplary embodiments of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention may be implemented as a single application comprised of multiple sub-applications. A first sub-application may be a default sub-application that provides non-sensitive subject matter and may be freely accessed by a primary user and a secondary user. A second sub-application may provide sensitive subject matter that is appropriate for access by the primary user but is inappropriate for access by the secondary user. As initially, only the first sub-application is utilized (e.g., "active"), the functionality of the second sub-application may be regarded as camouflaged (e.g., "inactive") as there might be no perceivable indication within the first sub-application of the existence of the second sub-application.

The second sub-application may be initiated within the execution of the first sub-application upon the satisfaction of certain de-camouflage criteria, that will be discussed in greater detail below. However, prior to the initiation of the second sub-application, the first sub-application may appear to be the only implementation of the application and a manner of executing the application may be designed around the first sub-application, including the name of the application, its launch icon, its description within an application repository (e.g., "app store"), etc.

The first sub-application may be, for example, a web browser. However, the present disclosure is not necessarily limited thereto. FIG. 1 is a schematic diagram illustrating an example user interface screen of a first sub-application embodied as a web browser in accordance with exemplary embodiments of the present disclosure. The user interface of the first sub-application may be a first user interface ("UI") that is free of sensitive information such as adult content or confidential financial/health information. The first UI may include a search bar and/or an address bar, although it is to be understood that in many instances, the search bar and the address bar may be a singular UI element. The first UI may also include navigation arrows, a settings button, and other UI elements commonly found within a web browser.

The de-camouflage criteria may be detected among a user interaction with the first UI of the first sub-application, for example, an area for receiving human-machine interaction, and so UI elements such as the search bar and/or an address bar may be used to provider the user interaction which might include the de-camouflage criteria. However, the first sub-application does not indicate to the user that user interaction may be tested to detect de-camouflage criteria and unless the de-camouflage criteria is satisfied, the first sub-application may continue to operate normally as a web-browser or whatever sort of functionality is attributed to the first sub-application.

The user interaction may be understood to mean a human and machine interaction ("human-machine interaction") which may include any input provided by a human to the device, such as inputting text, capturing a photograph, or connecting an accessory device to the device, filling a questionnaire, importing bookmarks from another application, etc. Alternatively, the human-machine interaction can be a passive interaction that the user may have with the application running on the device. For example, the human-machine interaction may include a length of time that the first sub-application has been active for and the predetermined condition may be when the length of time that the first sub-application has been active for exceeds a predetermined threshold. However, the human-machine interactions are not necessarily limited to these provided examples.

Figure 2:
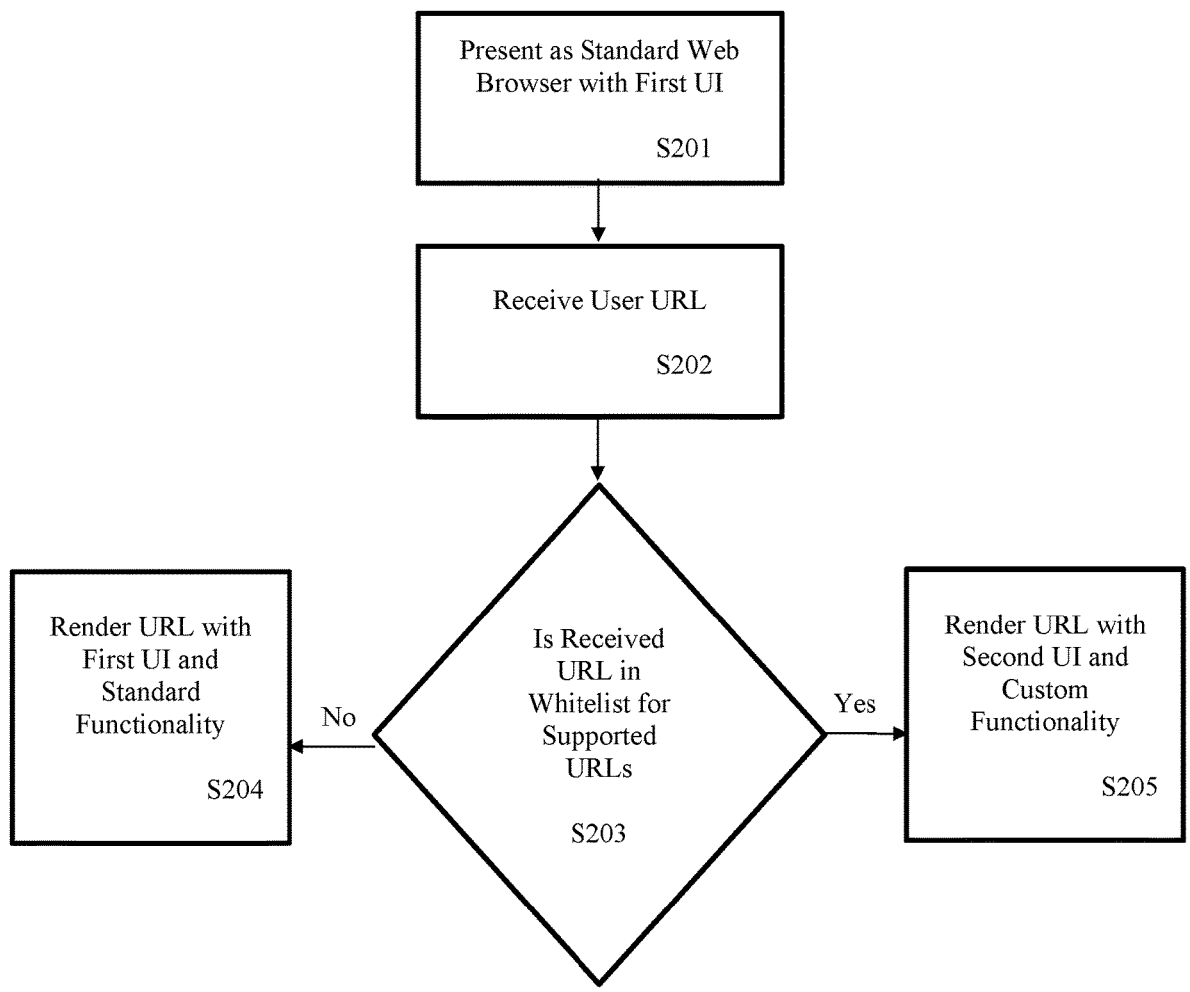
FIG. 2 is a flowchart illustrating an approach for operating an application with a camouflaged sub-application in accordance with exemplary embodiments of the present disclosure.

FIG. 2 is a flowchart illustrating an approach for operating an application with a camouflaged sub-application in accordance with exemplary embodiments of the present disclosure. This approach represents a simplified embodiment of the present disclosure and other embodiments, and in particular, broader embodiments, will be described below in greater detail. Upon the execution of the application, the first sub-application may be active and presented (here, for example, a standard web browser) using a first UI (Step S201). The web browser may receive a URL inputted by the user, for example, within an address bar (Step S202). The web browser may determine if the received URL is within a whitelist of supported URLs, such as URLs for certain adult-oriented web pages that may be able to benefit from the functionality of the camouflaged sub-application (Step S203). For example, rather than checking the received URL against a whitelist, an artificial intelligence A.I. recognition module may be used to determine if the received URL is adult-oriented or otherwise able to benefit from the functionality of the camouflaged sub-application, for example, by examining the URL name or by examining a website associated with the URL for contextual information. If the entered URL is not within the whitelist (or is otherwise not determined to be sensitive)(No, Step S203) then the website associated with the entered URL may be rendered by the standard web-browser within the first UI (non-sensitive content) and the user might not be provided with any indication that de-camouflage criteria had not been satisfied. Even if the entered URL is associated with an adult-oriented web page, as long as the URL is not within the whitelist (or is otherwise not determined to be sensitive), the website associated with the entered URL will be rendered in a standard fashion.

When the entered URL is within the whitelist for supported URLs (Yes, Step S203) (or is otherwise determined to be sensitive), then the camouflaged sub-application may take over for the standard web browser (Step S205). This is to say, the first sub-application may be deactivated and the camouflaged sub-application may be activated. The camouflaged sub-application may be presented using a second UI that may include sensitive subject matter and may add options for functionality beyond the standard web browser. This added functionality is discussed in greater detail below.

Figure 3:
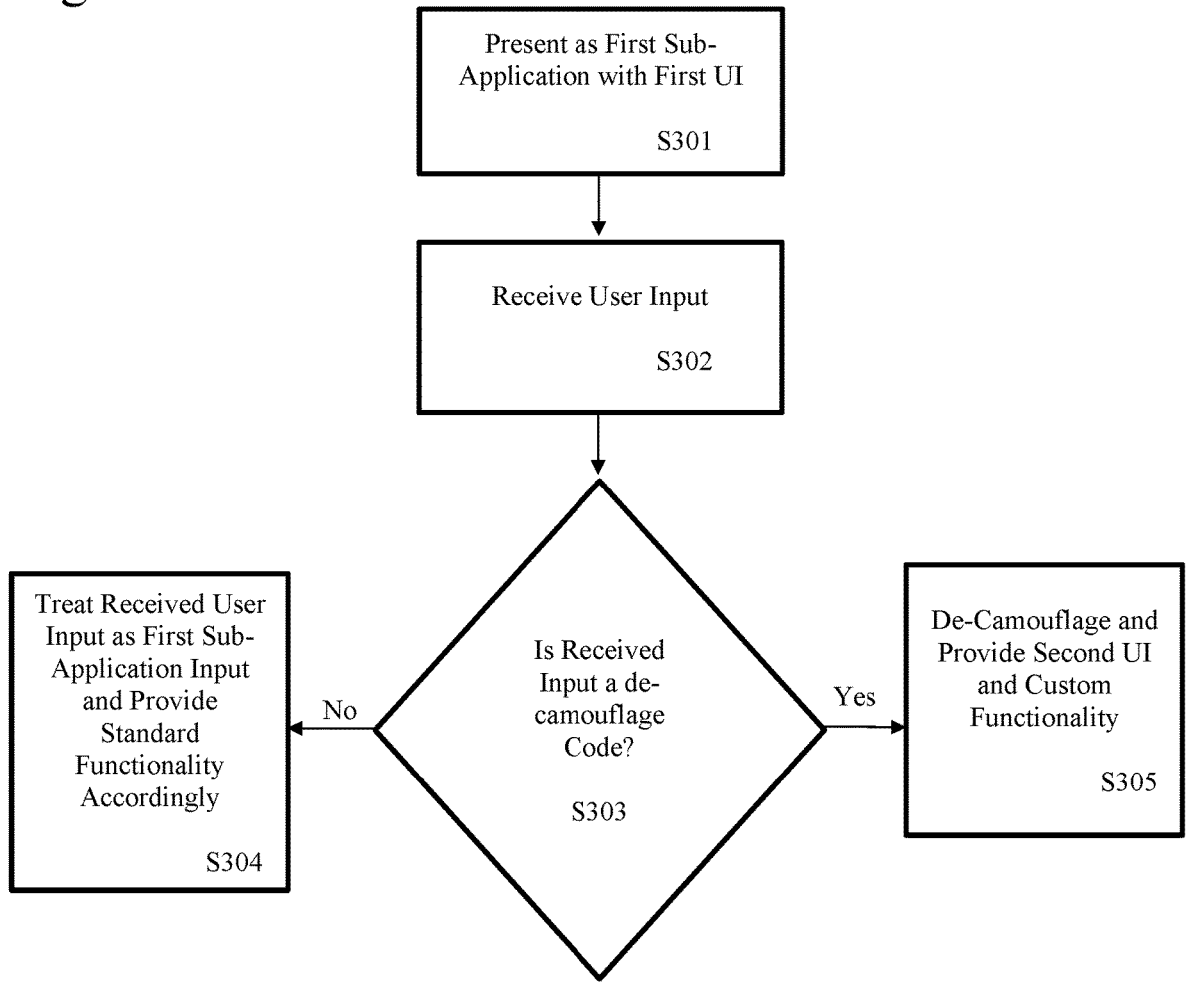
FIG. 3 is a flowchart illustrating an approach for operating an application with a camouflaged sub-application in accordance with exemplary embodiments of the present disclosure.

As described above, the first sub-application is not necessarily limited to being a web browser and the de-camouflage criteria is not necessarily limited to a whitelisted URL. FIG. 3 is a flowchart illustrating an approach for operating an application with a camouflaged sub-application in accordance with exemplary embodiments of the present disclosure. Here again, the first sub-application having a first UI (not sensitive) is executed by default when the application is run (Step S301). User input is received as the user interacts with the application (Step S302). The application may then determine whether the user input constitutes a de-camouflage code (Step S303). A de-camouflage code may be a password that is entered by the user as part of a UI element that does not appear to be a password field UI element. For example, where the first sub-application offers the appearance and functionality of a calculator, the user input may be a number entered into the calculator. For example, where the first sub-application is an alarm clock application, the user input may be a particular time that an alarm is set for. In either event, the de-camouflage code may be very specific and unlikely to be entered as part of the normal use of the first sub-application. For example, in the calculator embodiment, the de-camouflage code may be a number –30.87 and in the alarm clock embodiment, the de-camouflage code may be an alarm set for a particular time that is beyond the normal range of a time of day, such as 10:63 AM.

If the received user input does not match a pre-determined de-camouflage code (No, Step S303), then the user input may be treated as a normal interaction with the first sub-application and standard functionality may be provided (Step S304). For example, where the first sub-application is a calculator, a number entered that does not match the de-camouflage code may be treated as a normal operand. Where the first sub-application is an alarm clock, a time entered that does not match the de-camouflage code may be treated as a normal alarm time and an alarm may be set for the entered time.

Where the received user input matches the de-camouflage code (Yes, Step S303), the second sub-application may be de-camouflaged and the second sub-application may run in place of the first sub-application (Step S305). The second application may again offer custom functionality using a second UI that includes sensitive subject matter.

Figure 4:
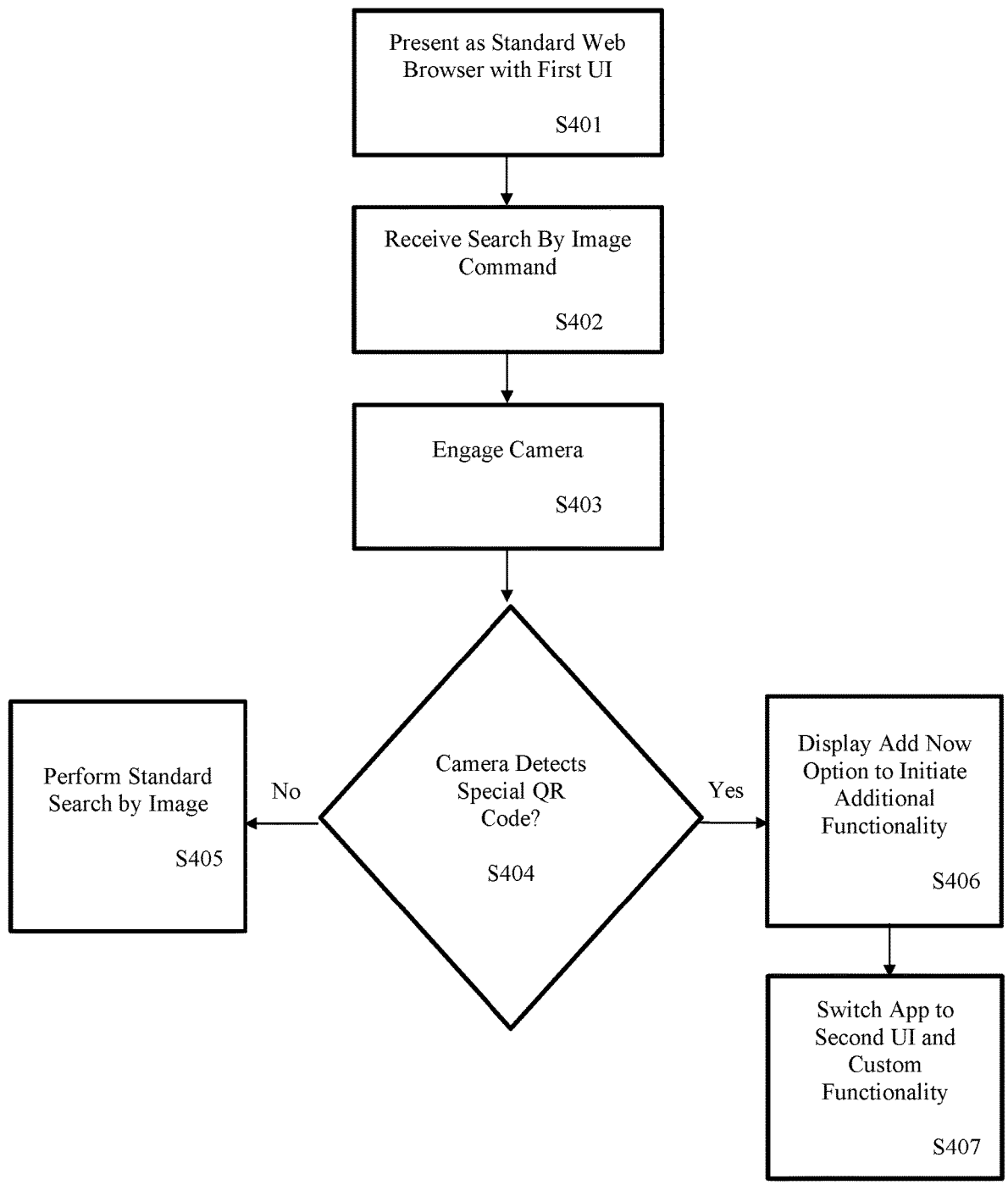
FIG. 4 is a flowchart illustrating an approach for adding camouflaged functionality to an application in accordance with exemplary embodiments of the present disclosure.

Unlike the approaches described above, the entering of the de-camouflage criteria need not automatically launch the second sub-application. In fact, the second sub-application might not even be within the code base of the application and the de-camouflage criteria may be used to install code for the additional functionality. FIG. 4 is a flowchart illustrating an approach for adding camouflaged functionality to an application in accordance with exemplary embodiments of the present disclosure. Upon running the application, the first sub-application may present itself within a first UI (Step S401). Here again, a standard web browser is used as the first sub-application, however, it is to be understood that any non-sensitive sub-application may be used.

The user interaction used to test for de-camouflage criteria need not be a single step or a single code, as discussed above. Here, the user interaction may include the user initiating a web search by image (Step S402) which engages a camera on the device running the application (Step S403) and the user may then point the camera towards a special QR code. Where the added functionality of the second sub-application pertains to the operation of an adult toy, the special QR code may be printed on the adult toy or within its associated packaging and paperwork. Where the camera of the device does not detect the special QR code (No, Step S404), then a standard search by image may be performed using the image acquired by the camera. However, where the camera does detect the special QR code (Yes, Step S404), then a dialog UI element may appear inviting the user to add functionality to the application (Step S406). Upon affirming the choice to add functionality, the application may download and install the added functionality over the Internet, in the form of the second sub-application, and may then switch to the second sub-application (Step S407).

Once the second sub-application has been installed, the first sub-application may be switched to the second sub-application during future uses either by the scanning of the special QR code in the manner described above, or by the use of other de-camouflage criteria described herein.

It is to be understood that the special QR code is offered merely as an example, and in this particular embodiment, the de-camouflage criteria may include capturing a picture of the adult toy itself, rather than a special QR code associated therewith, and so the first sub-application may then perform image recognition on the acquired image to determine if it includes the adult toy.

Figure 5:
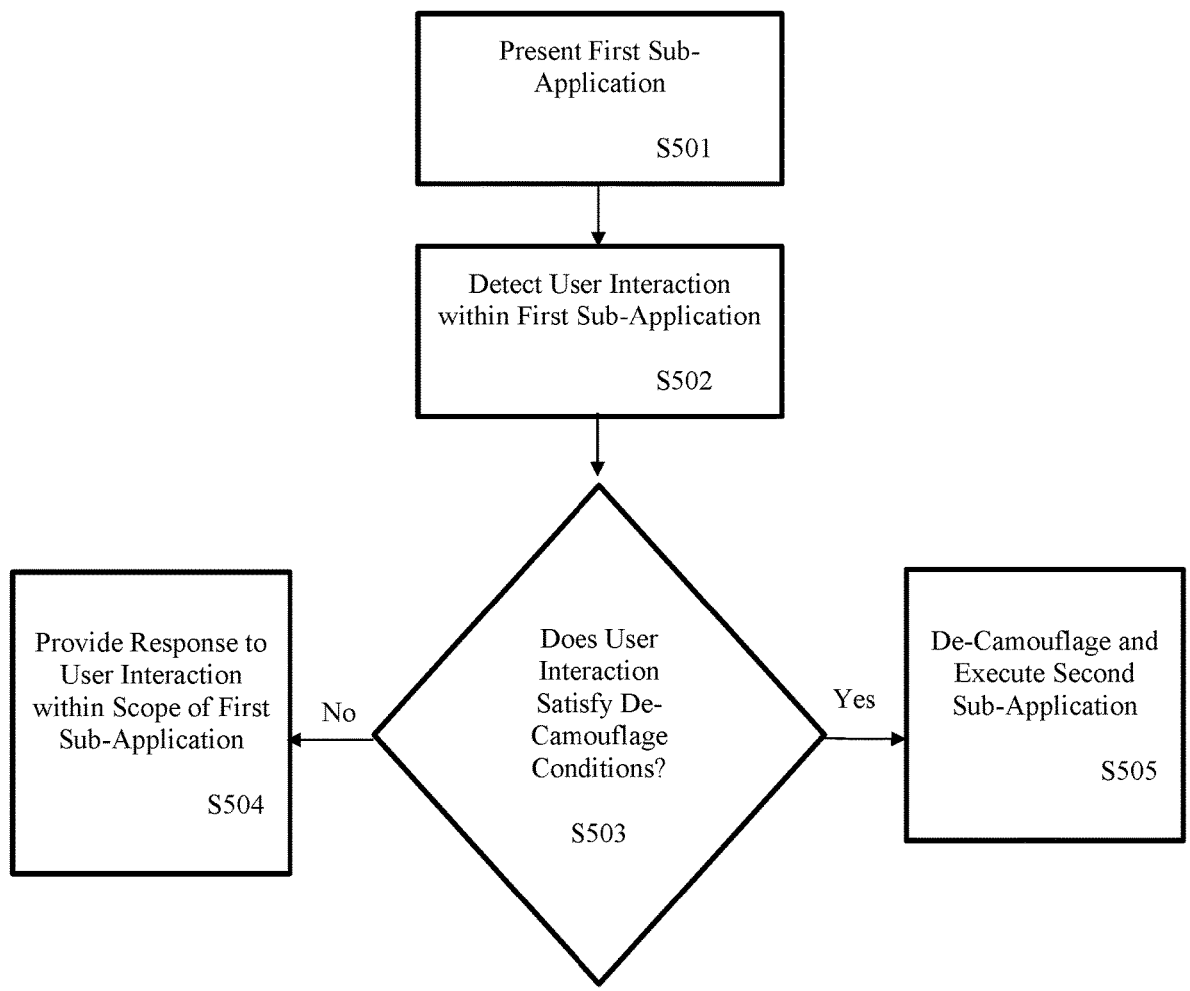
FIG. 5 is a flowchart illustrating a generalized approach for operating an application with a camouflaged sub-application in accordance with exemplary embodiments of the present disclosure.

FIG. 5 is a flowchart illustrating a generalized approach for operating an application with a camouflaged sub-application in accordance with exemplary embodiments of the present disclosure. As this approach is generalized, it is to be understood that any of the above-described specific steps may be used as part of this approach in any combination or order. According to this generalized approach, the first sub-application may be presented to the user upon the execution of the application (Step S501).

Next, a user interaction within the first sub-application may be detected (Step S502). This user interaction need not be the entering of text or the capturing of a particular image, but may be the connection of one of a range of particular adult toys via Bluetooth or some other means of connection, such as an adult toy sold by the creators of the application. In any event, the detected user interaction may be examined to determine if it satisfies predetermined de-camouflage conditions (Step S503). For example, it may be determined whether a particular adult toy has been connected to the device running the application. If the de-camouflage criteria has not been satisfied (No, Step S503), then the first sub-application would provide an appropriate response to the user interaction within the scope of that application (Step S504). If the de-camouflage criteria has been satisfied (Yes, Step S503) then the second sub-application may be executed in place of the first sub-application.

Figure 6:
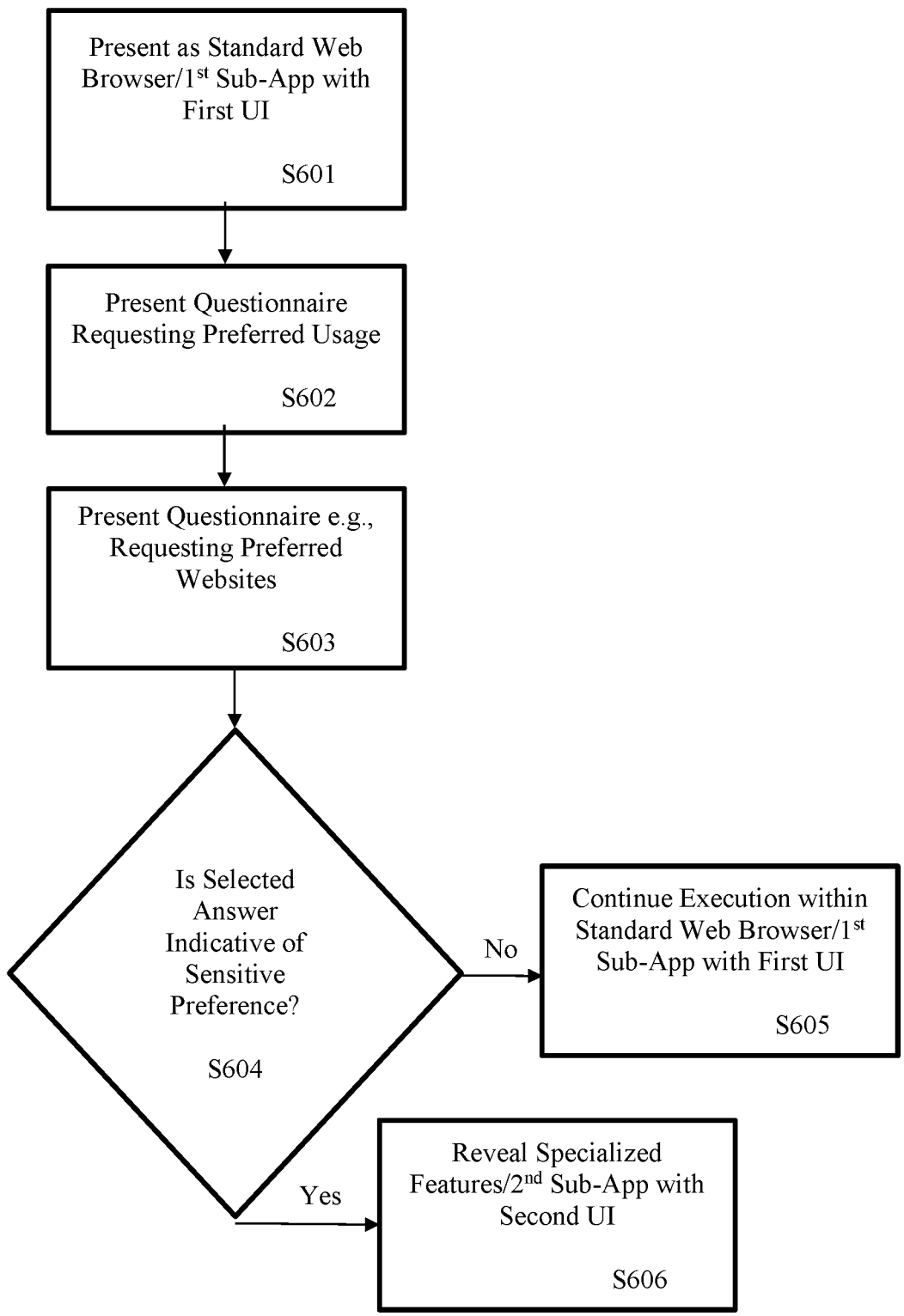
FIG. 6 is a flowchart illustrating an approach for operating an application with a camouflaged sub-application in accordance with exemplary embodiments of the present disclosure.

FIG. 6 is a flowchart illustrating an approach for operating an application with a camouflaged sub-application in accordance with exemplary embodiments of the present disclosure. According to this approach, upon executing the application, the application presents itself according to a first sub-application having a first Ut, the first sub-application being non-sensitive in nature e.g., not including adult content or other sensitive information (Step S601). For example, the first sub-application may be a standard web browser. Next, the application may present the user with one or more questionnaire screens or pop-up dialog elements. For example, the user may be presented with a first questionnaire requesting information about a preferred usage for the application (Step S602). For example, the use may be asked if their preference is for watching videos, streaming, or engaging in social media. In a next questionnaire element, the user may be asked to either type in preferred websites or the user may be asked to make one or more selections from a list of popular websites (Step S603). This list of popular websites may include both sensitive websites (e.g., adult-oriented websites) and non-sensitive websites. If it is determined that the user has entered or selected a sensitive preference (e.g., the user has selected a website known to be sensitive, for example, because it is included within a whitelist of sensitive websites) (Yes, Step S604), then de-camouflaging may occur and a set of sensitive specialized features, such as any of those described herein, may populate within the UI. This population of the set of sensitive specialized features may be referred to herein as the activation of a second sub-app including such features (Step S606).

These sensitive features may include recommended websites, chatrooms, streaming platforms, etc. that are of a sensitive (e.g., adult) nature and these recommendations may be populated as quick-select options within a homepage/start page of the application.

If, however, there are no sensitive selections (No, Step S604), for example, the user has entered/selected only non-sensitive websites (e.g., the user did not enter/select a website on the whitelist of sensitive websites), then the application may continue to execute as the first sub-app without sensitive content (Step S605).

Figure 7:
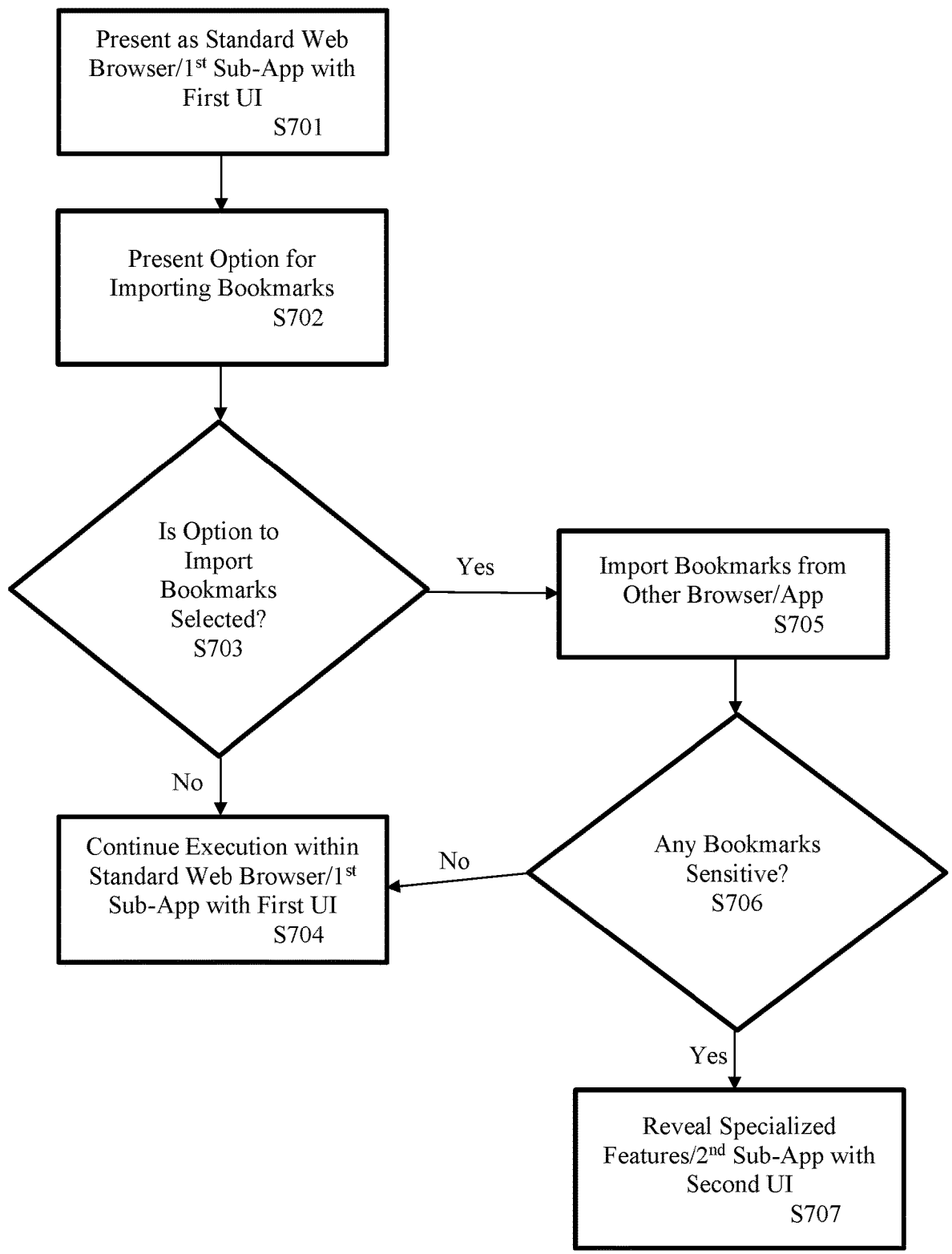
FIG. 7 is a flowchart illustrating an approach for operating an application with a camouflaged sub-application in accordance with exemplary embodiments of the present disclosure.

FIG. 7 is a flowchart illustrating an approach for operating an application with a camouflaged sub-application in accordance with exemplary embodiments of the present disclosure. According to this approach, upon executing the application, the application presents itself according to a first sub-application having a first UI, the first sub-application being non-sensitive in nature e.g., not including adult content or other sensitive information (Step S701). For example, the first sub-application may be a standard web browser. Next, the application may present the user with an option for importing one or more bookmarks/preferred websites from another browser or application (Step S702). If the option to import bookmarks is not selected (No, Step S703), then the application may continue to execute as the first sub-application, e.g., as a standard web browser without specialized sensitive capabilities (Step S704).

If, however, the user does opt to import bookmarks (Yes, Step S703), then one or more bookmarks may be imported from another browser or application installed on the device running the application (Step S705). It may then be determined if one or more of the imported bookmarks is of a sensitive (e.g., adult) nature (Step S706). This determination may be made, for example, by cross-referencing each imported bookmark with a whitelist of URLs that are of a sensitive (e.g., adult) nature. If none of the imported bookmarks are sensitive (No, Step S706), then the application may continue to execute as the first sub-application, e.g., as a standard web browser without specialized sensitive capabilities (Step S704).

If, however, one or more of the imported bookmarks is sensitive (Yes, Step S706), then de-camouflaging may occur and a set of sensitive specialized features, such as any of those described herein, may populate within the UI. This population of the set of sensitive specialized features may be referred to herein as the activation of a second sub-app including such features (Step S707).

It is to be understood that the present disclosure is not necessarily limited to including only one camouflaged sub-applications within the application. In fact the application may have a plurality of sub-applications disposed therein and the user interaction may be examined to determine not only whether a predetermined de-camouflage condition has been met, but to determine which of multiple de-camouflage conditions has been met so that the corresponding camouflaged sub-application may be de-camouflaged.

As described above, the second application may include sensitive subject matter, and may provide additional features and elements over what standard web browsers may provide, for example, for the purposes of providing a consolidated interaction with sensitive (e.g., adult) multimedia and real-time streaming.

For example, the first sub-application may be a standard web browser and the second sub-application may be configured to render a website while providing enhanced features such as the ability to reorganize HTML elements of a web page and add additional interactive control elements thereto, so as to provide a consolidated layout for interacting with multiple live-streaming sessions at the same time, for example, as described in further detail below.

The reorganization of HTML elements may include, for example, shifting the display location of the element from one on-screen position to another, swapping the location of two different elements, adding one or more additional functional elements (such as static elements) that are not provided by the web page, removing (or refraining from rendering) one or more functional elements (such as static elements) that are provided by the web page, and simultaneously rendering one or more video feeds, or other dynamic elements, over or within the rendering of the web page.

The one or more video feeds may be rendered by the use of incorporating a video streaming player into the web page rendering. Reorganizing the HTML elements may include accessing a download link of a video file for streaming the video file, retrieving streaming data for playing a real-time streaming video, and/or regenerating/augmenting a video flow by intercepting one or more frames of video from the real-time stream and making one or more changes to the manner in which these frames are displayed, prior to displaying them in the modified manner.

The second sub-application may additionally or alternatively provide various other features related to the creation, consumption, and/or rendering of sensitive content. Recently, users have been able to view live-streamed broadcasts and events over the Internet using a web browser running on a device such as a computer or smartphone. While in some instances, users might only be able to view the broadcast or event, in other instances, users are able to interact with the broadcast by participating in a live broadcast room website where multiple users may be able to view the live stream and chat in real-time with the content creators and other users. Users may also be able to send tips and virtual gifts to the content creators in real-time as the broadcast continues so as to win the attention of the content creator.

Users may even be able to participate in an on-line multiplayer game from the broadcast room website. Such games may be known as "live-stream games." Live-stream games may have certain advantages over typical multiplayer on-line games as the game itself is streamed and provided as a game-as-a-service and no separate game application need be downloaded and installed on the user's device.

While ordinary web browsers are generally used to view live-streamed broadcasts, participate in associated chatrooms, and to play live-stream games, specialized browsers for desktop computers and/or mobile devices may be used to enhance the live-stream experience.

Exemplary embodiments of the present invention may implement a standard web browser as a first sub-application and may then switch to a specialized web browser for connecting to one or more live-streaming sessions, over multiple live streaming platforms, and provide a streamlined and specialized user interface therein for viewing the live-stream, participating in a chat room associated with the live-stream, playing a video game associated with the live-stream and/or remotely controlling the operation of a sex toy device in the possession of a content creator of the live-stream and/or having the operation of a sex toy device in the user's possession controlled by the content creator and/or another participant in the live-stream, as a second sub-application, upon satisfying predetermined de-camouflage conditions.

The specialized browser may combine features typical of a mobile browser, such as accepting URLs and rendering webpages, but the specialized browser may add to this capability, certain specialized capabilities for managing live-streaming sessions over multiple platforms, including providing customized user interfaces and consolidated alerts, and managing interactions and control over remotely operated sex toy devices. The specialized browser may be referred to herein as the Consolidated Browser.

Figure 8:
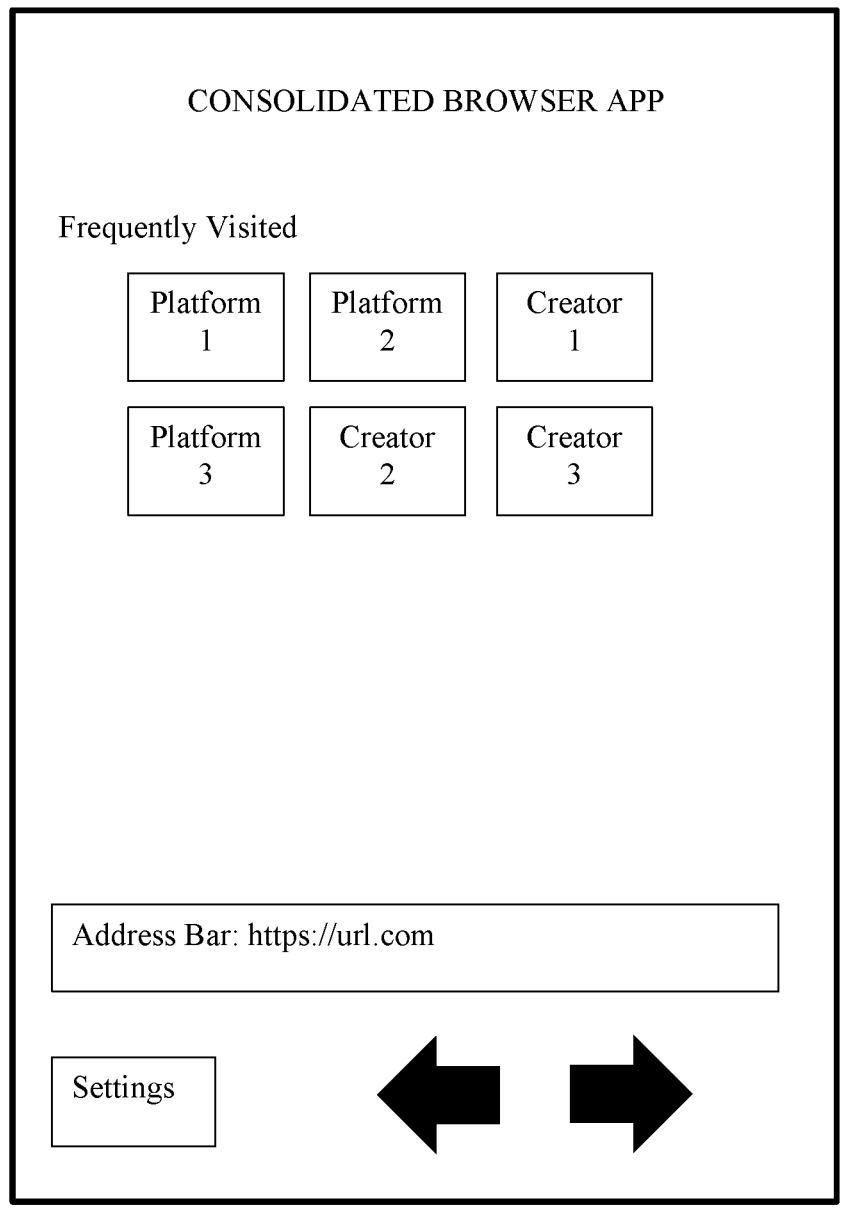
FIG. 8 is a schematic diagram illustrating a user interface (UI) element of the Consolidated Browser in accordance with exemplary embodiments of the present disclosure.
Figure 12:
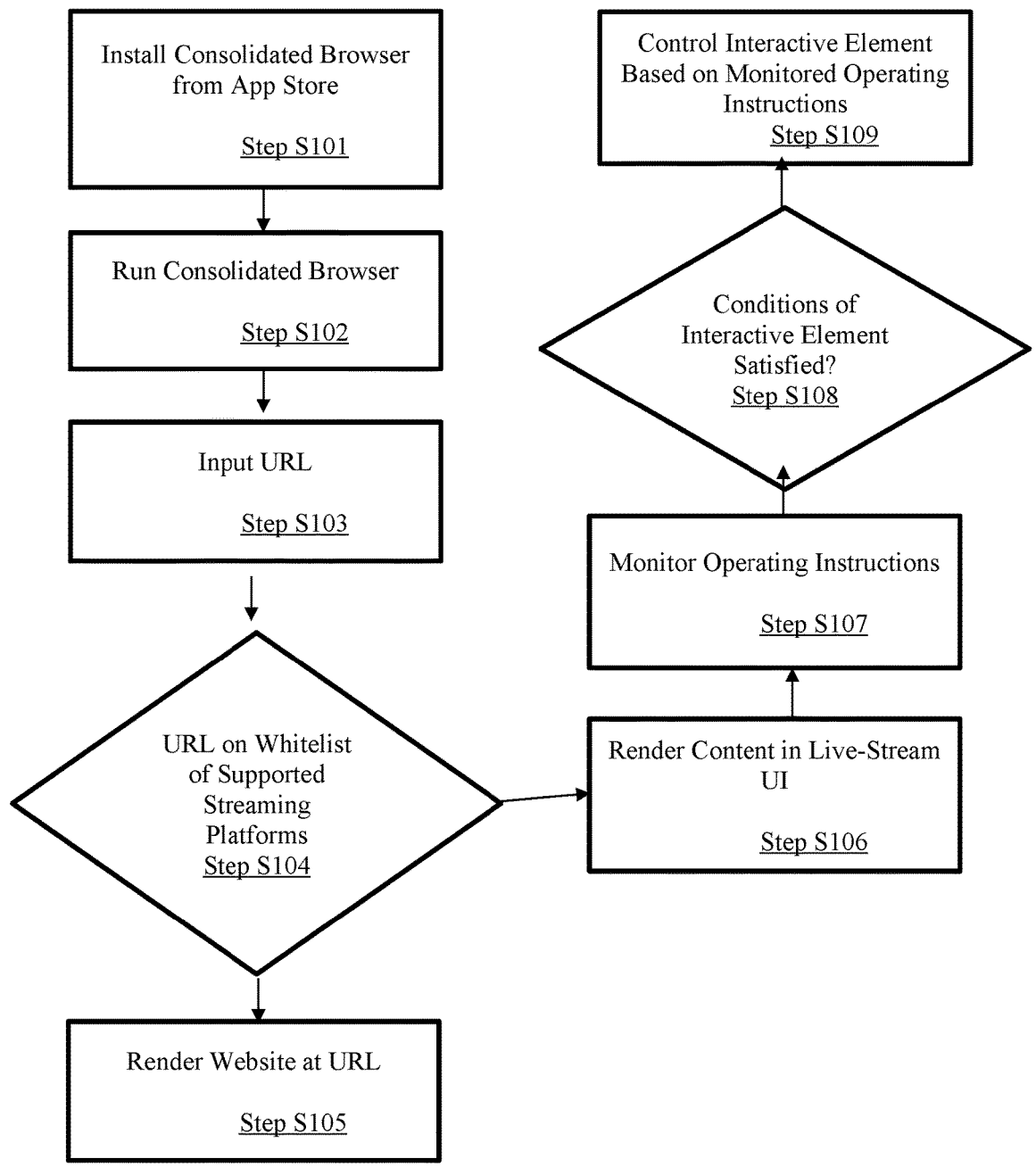
FIG. 12 is a flowchart illustrating a method for interactive web browsing in accordance with an exemplary embodiment of the present disclosure.

FIG. 8 is a schematic diagram illustrating a user interface (UI) element of the Consolidated Browser in accordance with exemplary embodiments of the present disclosure. FIG. 12 is a flowchart illustrating a method for interactive web browsing in accordance with an exemplary embodiment of the present disclosure, referring to FIGS. 8 and 12, using a viewer device, such as a smartphone, a user may first initiate the installation of the Consolidated Browser from an application repository (e.g., an app store)(Step S101). The user may then execute the Consolidated Browser app after it has been installed (Step S102), for example, as a second sub-application as described above.

Figure 9:
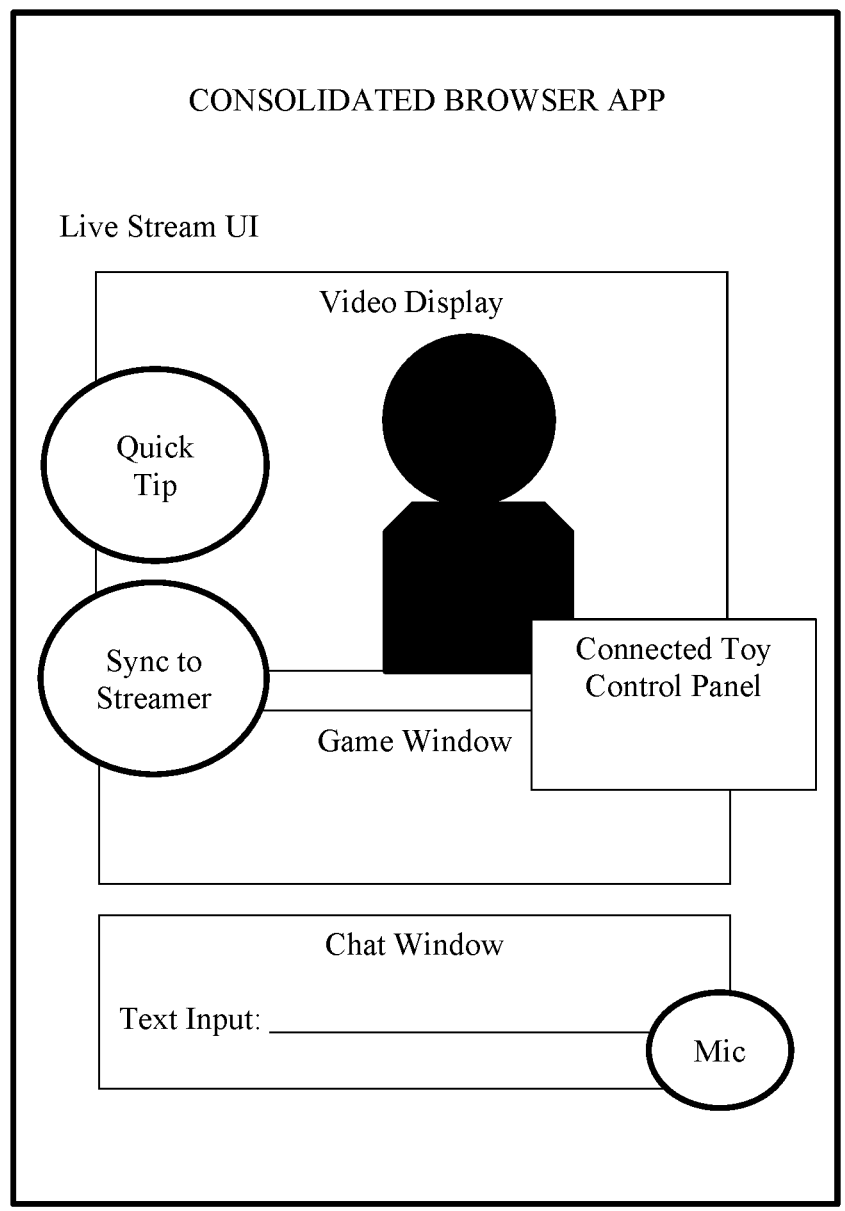
FIG. 9 is a schematic diagram illustrating a live-stream UI of the Consolidated Browser in accordance with exemplary embodiments of the present disclosure.

Exemplary embodiments of the present disclosure may thereby provide a user an address bar where the user can enter a URL or search criteria for searching for a particular URL. The user may input a URL within the address bar (Step S103). The Consolidated Browser may determine whether the input URL corresponds to a live-streaming platform or another form of website, for example, by consulting a whitelist of supported live-streaming platforms (Step S104). If the Consolidated Browser determines that the URL corresponds to another website, then the URL will be rendered as a website, for example, using an available rendering engine such as WEBKIT provided by Apple Inc., BLINK, provided by Alphabet Inc., GECKO provided by MOZILLA, or another suitable rendering engine (Step S105).

Where the Consolidated Browser determines that the URL corresponds to a supported live-streaming platform or another type of entertainment-enabled website for delivering content pre-registered in a specially supported website white list, rather than rendering the URL website, the Consolidated Browser will interface directly with the live-streaming platform to provide its livestreams to the Consolidated Browser's consolidated UI in which multiple live-streams across multipole different platforms may be accessed and participated in using a unified UI (Step S106) or to the Consolidated Browser's specialized UI such as a broadcast room page re-rendered like FIG. 9. Thus, exemplary embodiments of the present invention may determine whether an entered website URL corresponds to a specially supported website, and where it does, rather than rendering the website in a traditional manner, the website may be re-rendered in such a way as to provide enhanced interactive functionality within the Consolidated Browser app itself, such that the viewer/user can interact through a means of communication that is independent of the specially supported website and is handled directly by the Consolidated Browser and its assisting webservices to facilitate a more direct and engaging line of communication between and among viewer/users and the content provider/streamer, either by text chat, voice chat, video chat, direct control of each other's sex toys, and/or by the control of cameras or other streaming accessories corresponding to the content provider/streamer or any other device that contributes to the content creation while the viewer/user simultaneously participates in the live-stream via the associated streaming platform.

FIG. 9 is a schematic diagram illustrating a live-stream UI of the Consolidated Browser in accordance with exemplary embodiments of the present disclosure. As can be seen from this figure, the live-stream UI may display the live stream video, a chat window for participating in a chat associated with the live-stream, and various other elements which will be described in greater detail below.

As can be seen from FIG. 8, the Consolidated Browser may even maintain a list of recently/frequently visited live-streaming platforms and/or content creator subscriptions, proximate to the address bar, for example, on a same starting page as the address bar. Clicking or pressing on an icon associated with a given recently/frequently visited live-streaming platform may lead the user directly to a page showing available live streams associated with that platform. The user may then click on an available live stream to begin participation therein.

The user may also choose to subscribe/follow a particular content creator and the Consolidated Browser may send an alert to the user whenever that content creator has a livestream, regardless of the platform it is on. The Consolidated Browser may accomplish this task by interacting with a central server that checks for live streams across all supported platforms.

Figure 10:
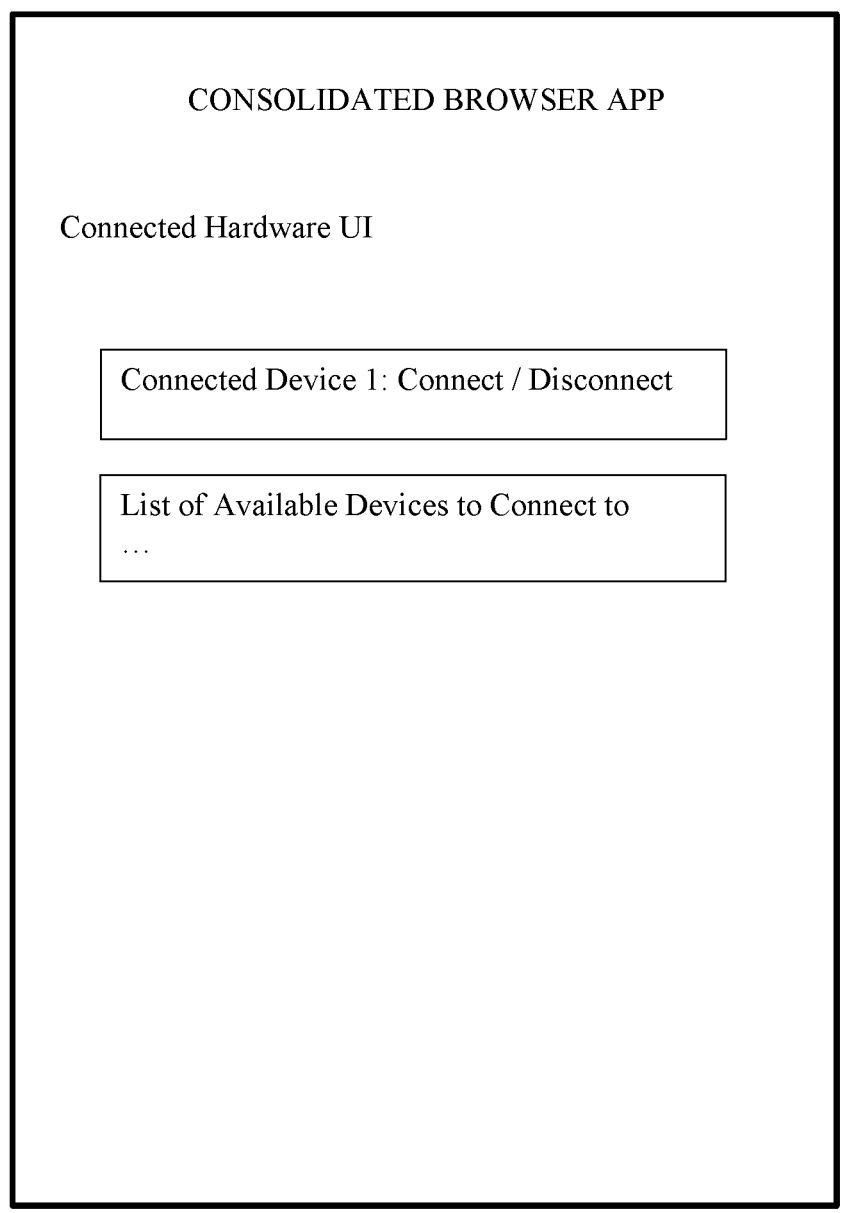
FIG. 10 is a schematic diagram illustrating a connected hardware UI of the Consolidated Browser in accordance with exemplary embodiments of the present disclosure.

As mentioned above, the Consolidated Browser may also provide a UI for the user to connect the Consolidated Browser to a local sex toy in the possession of or in proximity to the user for the purpose of offering access/control of this local sex toy to other viewers or content creators over live-streams. FIG. 10 is a schematic diagram illustrating a connected hardware UI of the Consolidated Browser in accordance with exemplary embodiments of the present disclosure. The Consolidated Browser may provide this access/control either by interfacing with access provided by the particular live-streaming platform or by a direct connection managed by the central server that bypasses the need to go through the live-stream platform, for example, where the user is using the Consolidated Browser and the content creator is using a compatible app or service (such as the Connect APP illustrated in FIG. 14) that is similarly in communication with the central server supporting the Consolidated Browser. In this respect, the content creator may make use of the central server to register a sex toy for remote control and the user may make use of the control panel functionality, such as that illustrated in FIG. 15, provided by the same central server to establish access/control of a sex toy of a content creator who is live streaming on a live streaming platform, without the control necessary being managed by the live streaming platform.

Figure 14:
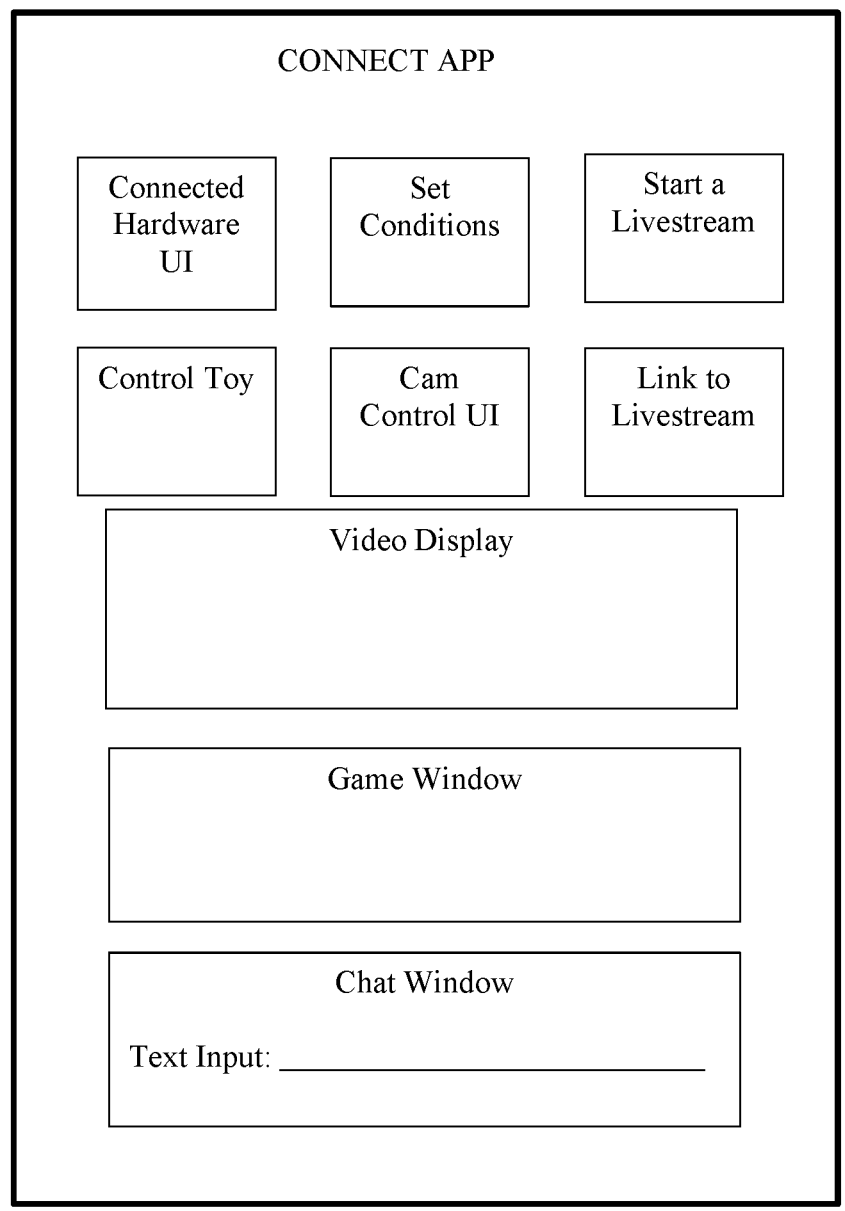
FIG. 14 is a diagram representing the Connect APP and some of the functionality made available thereby in accordance with exemplary embodiments of the present invention.

FIG. 14 is a diagram representing the Connect APP and some of the functionality made available thereby. The Connect APP, for example, may provide the content creator with a UI for connecting hardware, a UI for controlling connected sex toys, a UI for establishing gating conditions for control of their toys and cameras, a UI for controlling their own camera, a UI for starting a livestream on a streaming platform, and a UI for linking an existing livestream to the Connect APP. Other UI elements may also be included, for example, there may be a UI element for each function of the Connect APP discussed and/or described herein.

Figure 15:
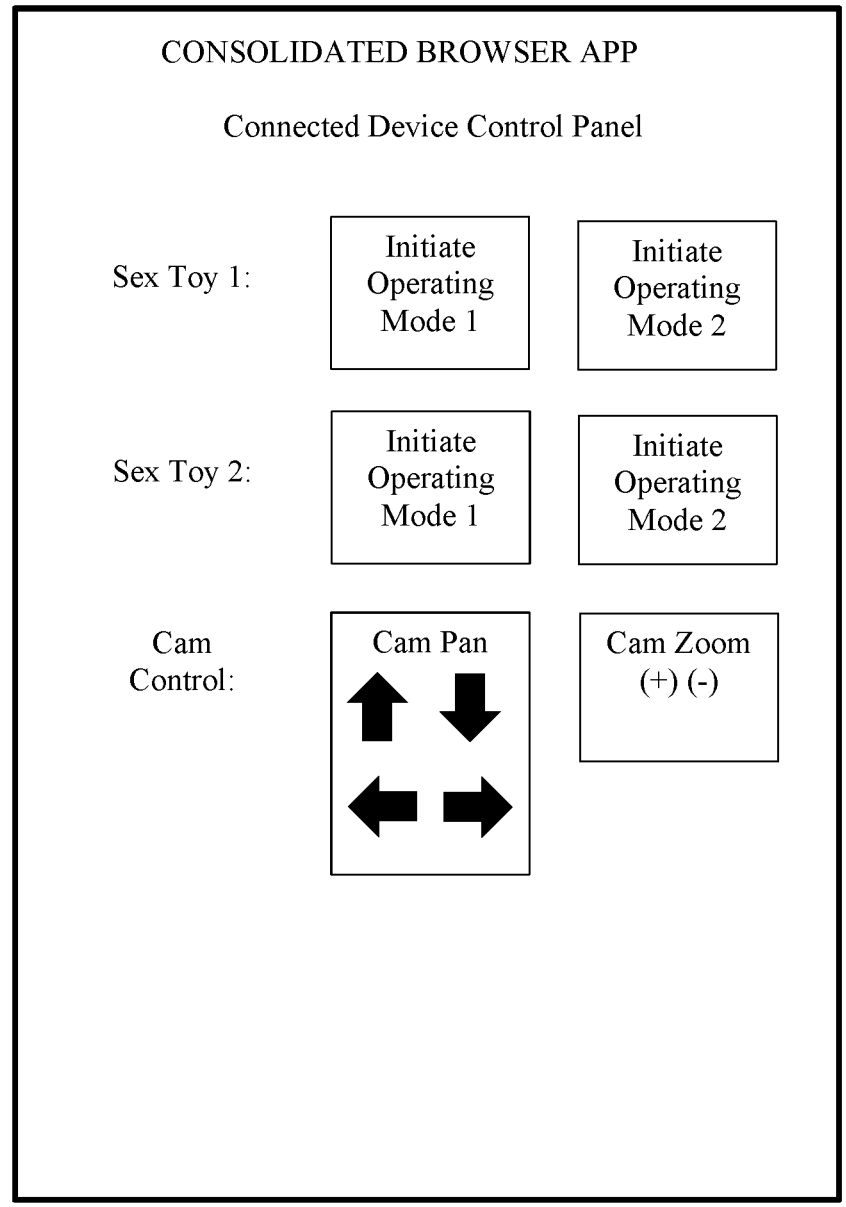
FIG. 15 is a diagram representing a connected device control panel within the Consolidated Browser App in accordance with exemplary embodiments of the present invention.

FIG. 15 is a diagram representing a connected device control panel within the Consolidated Browser App in accordance with exemplary embodiments of the present invention. One or more of these functions may be gated by the satisfaction of conditions established by the content creator, as described above, and this control panel may feature control buttons for initiating operational modes of one or more sex toys associated with the content creator and/or other viewers. The illustrated controls are symbolic but there is no limit to how detailed the control of the devices may be. In addition to controlling the sex toys, this control panel, or a similar control panel, may be used to control the operation of the camera of the content creator, including, but not limited to, directional panning and/or rotation, and zooming in/out.

The Consolidated Browser may additionally offer a filtering function to the user so that a browsing page of the Consolidated Browser may list, or graphically display, multiple broadcast rooms across different broadcast platforms. The respective content creators/models for these displayed broadcast rooms may use their devices to run software (locally or over one or more web services) to interface with the central server and locally connect their sex toys thereto so as to stream their content via different broadcast servers that correspond to broadcast platforms.

As discussed above, the Consolidated Browser may provide a similar UI for each live stream regardless of which platform that live stream is hosted on. Referring back to FIG. 9, this live stream UI may provide a window for playing the live-stream video, a window for showing chats, and a window for entering text to send to the chat. The live stream UI may also prominently show a quick tip icon that may float over the video window (although it may be moved) and may permit the user a quick way to send a monetary tip or some other transfer of points to the content creator, with the particulars of the transaction being managed by the Consolidated Browser app or its central server. Thus, the Consolidated Browser may be pre-programed with information on how to consummate a tip transaction for each of the supported platforms so as to handle tipping seamlessly to the user. In another embodiment, the quick tip icon may be used to autopilot an original html element (e.g., a tip sending button native to the live-stream platform) of the website.

Another quick icon may be similarly displayed along with the quick tip icon. This icon may be a "sync to streamer" icon that allows for the operation of a user's sex toy to be synchronized to the operation of the content creator's sex toy. When activated, the Consolidated Browser may monitor sex toy activity of the content creator and then replicate this activity to the user's sex toy that is linked to the device that the Consolidated Browser is running on, for example, via Bluetooth.

The live stream UI may also provide UI elements for performing all functions that are performable by directly connecting to the live stream platforms, for example, by accessing using a conventional web browser, however, each of these functionalities may be represented in a unified way so as to provider the user with a seamless experience that is consistent across diverse platforms.

For example, microphone functionality ("Mic") may be provided to allow the user to activate the microphone of the user's device so as to contribute audio to the live-stream or directly to the content creator. The microphone functionality may be used either to send a recorded message that the content creator can listen to when ready, or to send audio in real-time to be heard by the content creator and/or other viewer participants.

When the Consolidated Browser is rendering a live-stream from information derived from a live stream platform, the Consolidated Browser may continue to monitor for special operating instructions of the viewer (Step S107) that may be used to perform operations specific to the Consolidated Browser, as opposed to engaging with features of the live-stream platform. These operating instructions may relate to, for example, the games played within the live stream chat room or the control of connected devices such as cameras and sex toys.

The microphone feature, as well as other features described herein, may be restricted from use until a tip of a predetermined value is transferred to the content creator, or by other conditions set by the content creator. In this way, the special functionality of the Consolidated Browser may be gated by various conditions, such as a tipping condition. For example, the icons representing these features may be hidden or deactivated (e.g., grayed out) prior to the predetermined conditions being met. The predetermined conditions are not necessarily limited to tipping conditions as predetermined conditions may include, for example, earning a VIP designation within the Consolidated Browser app, purchasing an NFT privilege, connecting to a specific toy via the Consolidated Browser, etc. The Consolidated Browser may therefore check for the satisfaction of conditions when an instruction has been detected (Step S108). The Consolidated Browser may receive these tip conditions from the content creator and then gate access to these features in a manner consistent with the requests of the content creator submitted either through the Consolidated Browser or through a control panel accessible by a conventional browser, for example, the control panel being maintained by the central server, or though functionality of the individual platforms. Thus, when instructions have been detected (in Step S107) and it is determined that the necessary conditions have been satisfied (in Step 108) then the Consolidated Browser may extend control of the interactive element to the viewer (Step S109), for example, to play a game, control a sex toy of the content creator, and/or control a camera of the content creator.

The Consolidated Browser, for example through its associated central server, can directly handle text chats, interactive video games, and the sending of multimedia, among the user, the content creator, and other users accessing a same livestream using the Consolidated Browser, without going through the platform. In this way, communications associated with a live stream may circumvent the live stream platform to provide a greater level of engagement that is available only to users of the Consolidated Browser and not to other users that may be directly accessing the live stream through the platform's own web portal.

The Consolidated Browser may also provide to the user a control panel to control a mode of operation of a content creator's connected sex toy. This feature may also be gated by the satisfaction of a predetermined tip. The control panel, by having both the user and the content creator utilize the Consolidated Browser, may provide a very high level of control over the sex toy that might not otherwise be possible when having to go through the live streaming platform alone, and as discussed above, this control may be managed by the central server rather than the live streaming platform. Moreover, neither the user nor the content creator need make use of browser plugins and the like. However, where the content creator is not utilizing the Consolidated Browser, the Consolidated Browser may still manage a connection between the user's control panel and a browser plugin of the content creator designed for providing remote control of the content creator's sex toy.

The user may jump back and forth between the control panel and the live stream UI, for example, by the use of a fast switch icon displayed on each UI or the control panel may be implemented as a floating element on top of the live stream UI. The Consolidated Browser may also grant the content creator access to the connected sex toys of the user in a similar manner and the user can select among his registered connected sex toys to grant remote access to.

According to some exemplary embodiments of the present disclosure, and as mentioned above, the Consolidated Browser may provide to the user, for example, upon the satisfaction of a predetermined tip, control over the content creator's camera. For example, pan, tilt, zoom, and camera switch functionality may be transferred to the user. This may be implemented by the content creator registering one or more cameras with the Consolidated Browser and then control over these cameras may be placed under the direction of the user within a control panel, in a manner similar to how the user may gain control to a sex toy of the content creator. The central server of the Consolidated Browser may be used to negotiate camera/sex toy control in a secure environment without having to open control over a website such as the web portal of the live stream platform.

As discussed above, the Consolidated Browser may manage the play of interactive games between one or more users and the content creator. The Consolidated Browser may be used to render advanced graphics and/or sound associated with an interactive game occurring on the live stream platform, or the Consolidated Browser may host its own games that are played among live stream participants (e.g., the user, other viewers, and the content creator) while circumventing interaction with the platform.

The user may select a game play icon from the live stream UI and may bring up a game play UI where the user can create a new game or participate in a game being played. The game may be participated in by all live stream participants utilizing the Consolidated Browser and the Consolidated Browser may also provide a rendering for other games hosted on the platform. In this way, each participant may see and interact with the game being played. Rewards for winning games may similarly be used to grant access to the sort of controls discussed above that are gated.

The central server may monitor live streams, even when the user is not, so that the Consolidated Browser may be able to present to the user playbacks of prior live streams that were missed, or provide instant-replay type functionality where the user is participating in a live stream. The Consolidated Browser may even be able to provide playback of synchronized sex toy control, in addition to playback of live stream audio/video by recording toy control commands embedded within the recording of the live stream. Recordings may be maintained on the central server for a time, in a manner consistent with the requirements of the platform and content creator, and once again, this functionality may be gated by a tipping requirement.

The Consolidated Browser may provide other features such as matching sex toy control to website content accessed by the Consolidated Browser as a standard website, for example, by matching sex toy control to music, movies, audiobooks, etc. The user may be able to initiate, end, and adjust this sex toy control rendering by accessing a browsing control panel.

Figure 11:
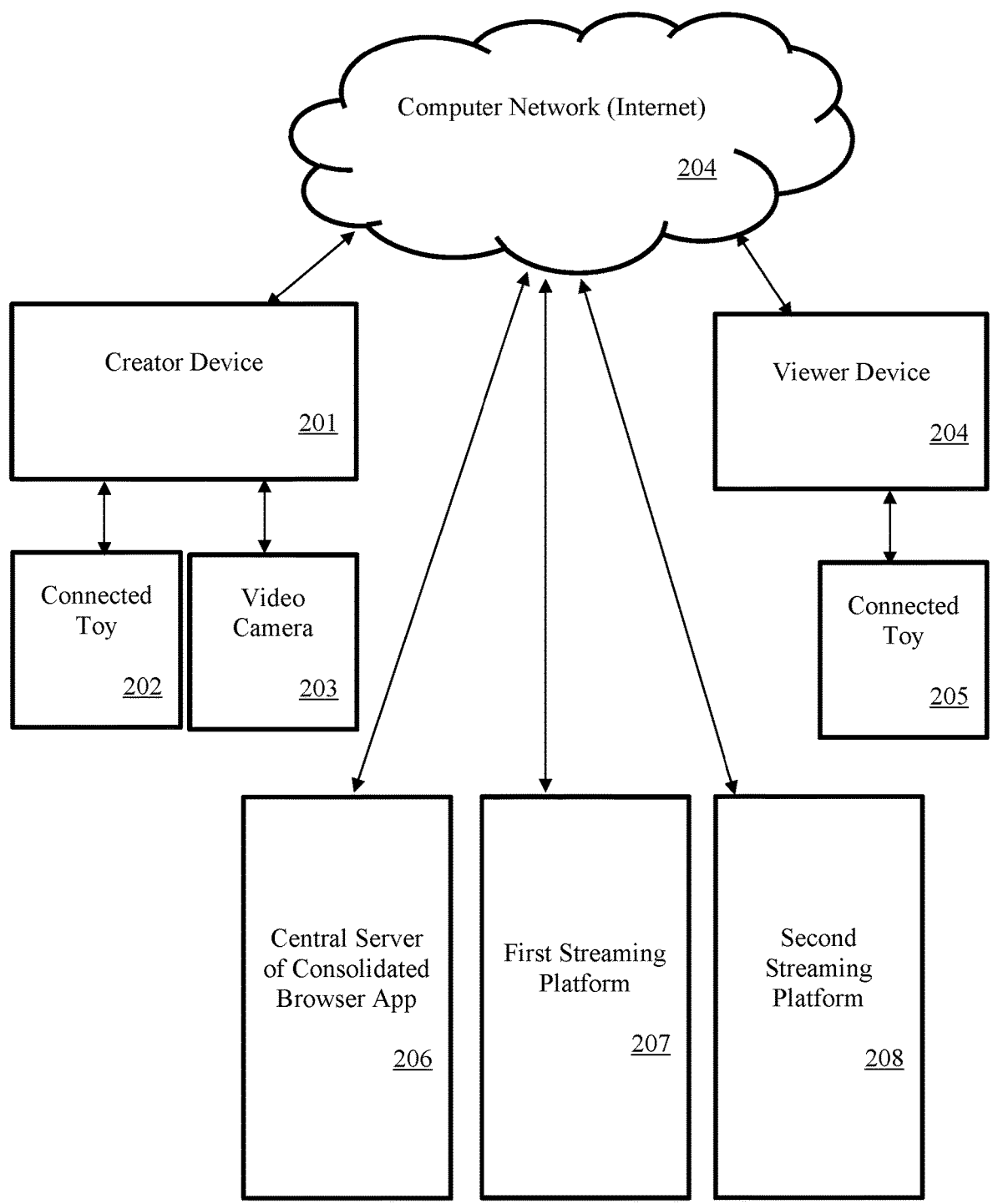
FIG. 11 is a schematic diagram illustrating a system for interactive web browsing in accordance with exemplary embodiments of the present disclosure.

FIG. 11 is a schematic diagram illustrating a system for interactive web browsing in accordance with exemplary embodiments of the present disclosure. As can be seen from this figure, a creator device 201 may run an application or web service for connecting to a central server 206 of the consolidated browser. This application or web service may be, for example, a version of the Consolidated Browser, but may alternatively be a custom application developed for granting content creators direct access to the functionality of the Central Server 206. The creator device 201 may be connected to a sex toy 202 via a local connection such as Bluetooth or wired USB. This connection may be managed by the application or web service discussed above. A video camera 203 may also be connected to the creator device 201 via a wired and/or wireless connection, or the video camera 203 may be part of the creator device 201. Control of the sex toy 202 and/or the camera 203 may be managed by the creator device 201 and this control may be granted remotely in accordance with the Consolidated Browser. The creator device 201 may be connected to a wide area computer network 204, such as the Internet.

The central server associated with the Consolidated Browser app 206 may also be connected to the computer network 204 so that the content creator app/web service (referred to herein as the "Connect APP") may contact the central server 206 over the computer network 204 so that the central server 206 may negotiate functionality of the Consolidated Browser, given to the viewers using the Consolidated Browser, that is not handled by the streaming platforms.

While there may be any number of streaming platforms whitelisted within the Consolidated Browser, each streaming platform may operate its own server(s) for hosting the live streams on its platform. A first streaming platform server 207 and a second streaming platform server 208 are shown for simplicity and each of these servers connects to the computer network 204 and in that way, the central server of the consolidated browser app 206 is able to observe data from the various streaming platforms.

There may be any number of viewers running the Consolidated Browser and each may have a viewer device 204, which may also be a smartphone, etc. The viewer device 204 may also have a sex toy 205 connected thereto, for example, for performing the synchronization discussed above.

Figure 13:
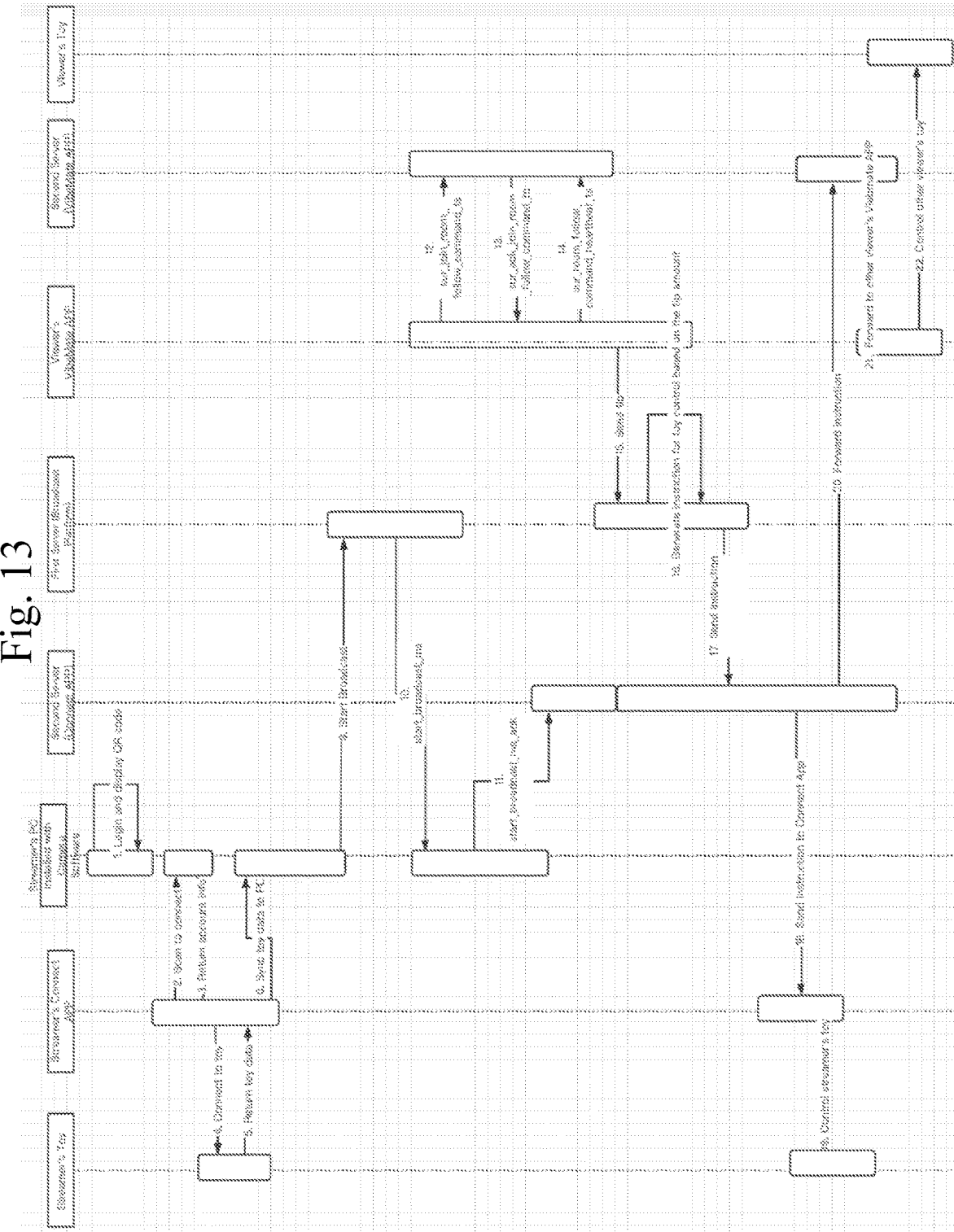
FIG. 13 is a signal diagram illustrating an approach for performing such an interaction.

As discussed above, exemplary embodiments of the present disclosure may utilize the Consolidated Browser to manage various interactions between the viewer and the content creator ("streamer") outside of the integration of the streaming platform. An example of one such interaction is the "sync with streamer" functionality discussed above in which the Connect APP manages the synchronization of operation of a sex toy of the content creator and a sex toy of the viewer. FIG. 13 is a signal diagram illustrating an approach for performing such an interaction. This discussion is provided as an example of how the Consolidated Browser and related elements may perform many such interactions.

First, the streamer may log in to the streaming platform using a computer and display a QR code for the purpose of allowing the streamer's smartphone running the Connect APP to engage with the streaming session (1). Next, the streamer's smartphone running the Connect APP may scan the displayed QR code to engage (2). Account information may then be sent from the streamer's PC to the Connect APP running on the smartphone (3). The streamer's PC to the Connect APP running on the smartphone may then connect to the streamer's sex toy (4) and the streamer's sex toy may return toy data pertaining to the operation thereof (5). The Connect APP running on the smartphone may then send the toy data to the streamer's PC (6).

The streamer may then begin the live-streaming session with the server of the streaming ("broadcast") platform (9) ("the first server"). The first server may interact with the streamer's PC to manage native interactions of the broadcast platform (10). Native interactions may include those interactions that the broadcast platform is known to manage, such as receiving streaming signals and relaying those signals to the viewers of the live-stream and managing basic chat room functionality such as sending and broadcasting text messages amongst the viewers and streamer and facilitating the transaction of tipping, which is the sending of points, tokens, and other representations of monetary value from the viewers to the broadcaster. The streamer's PC may then interact with a server of the Consolidated Browser ("second server"), via the Connect APP, to engage the second server to handle various interactions associated with the live stream that are not managed by the broadcast platform (i.e., to manage interactions that are not native to the broadcast platform) (11).

The viewer, running the Consolidated Browser, may then engage with the second server to join the live stream (12). The second server may interact with the viewer's smart phone running the Consolidated Browser to negotiate interactions and to participate in those functions provided by the Consolidated Browser that are not native to the streaming platform (13 & 14). The Consolidated Browser may also intermediate the interaction of the viewer with the native functionality of the live stream so as to provide the unified user experience discussed above. This may include the rendering of the live stream within the Consolidated Browser and the sending of a tip from the viewer to the streamer, which may be performed though the first server managed by the broadcast platform (15). The broadcast platform may thereafter generate and/or pass instructions for sex toy control to the second server (17) whose responsibility it is to implement toy control commands. The second server may send the toy control commands to the streamer's smartphone running the Consolidated Browser (18) where the commands may then be passed back to the streamer's sex toy (19) thereby allowing the viewer to control the operation of the streamer's sex toy.

The second server, associated with the Consolidated Browser, may then forward sex toy instructions that are based on the instructions being implemented by the streamer's sex toy, back to the viewer's smart phone running the Consolidated Browser. These instructions may be referred to herein as "feedback" as they are instructions for the viewer's sex toy based on the operation of the streamer's sex toy. Here, this interaction is illustrated as including passing instructions between two implementations of the second server (20) and then forwarding instructions from the second implementation of the second server to the viewer's device (21). However, it is to be understood that the second server may be embodied as a distributed server having any number of actual server computers, as is also the case for the first server associated with the broadcast platform. For example, here, the first implantation of the Second Server may be associated with the Connect App of the streamer's PC while the second implementation of the Second Server may be associated with the Consolidated Browser (shown in this figure as the "VibeMate APP"). Alternatively, a single server may be relied upon to handle all functionality of the second server. Ultimately, however, the operation of the viewer's sex toy may be controlled according to the commands sent by the viewer's device. As the commands to control the viewer's sex toy are substantially synchronized with those of the streamer's sex toy, the "sync with streamer" functionality has been performed.

There may be additional viewers running the Consolidated Browser and viewing the same streaming content. For these additional viewers, instructions and communications from the Second Server associated with the Connect App may also be passed to a Second Server associated with their implementation of the Consolidated Browser (20) and these instructions and communications may then be passed on from the Second Server associated with their implementation of the Consolidated Browser to their implementation of the Consolidated browser (21) and in response, a sex toy of that viewer may be controlled (22) according to the passed instructions, for example, to implement the feedback discussed above.

Figure 16:
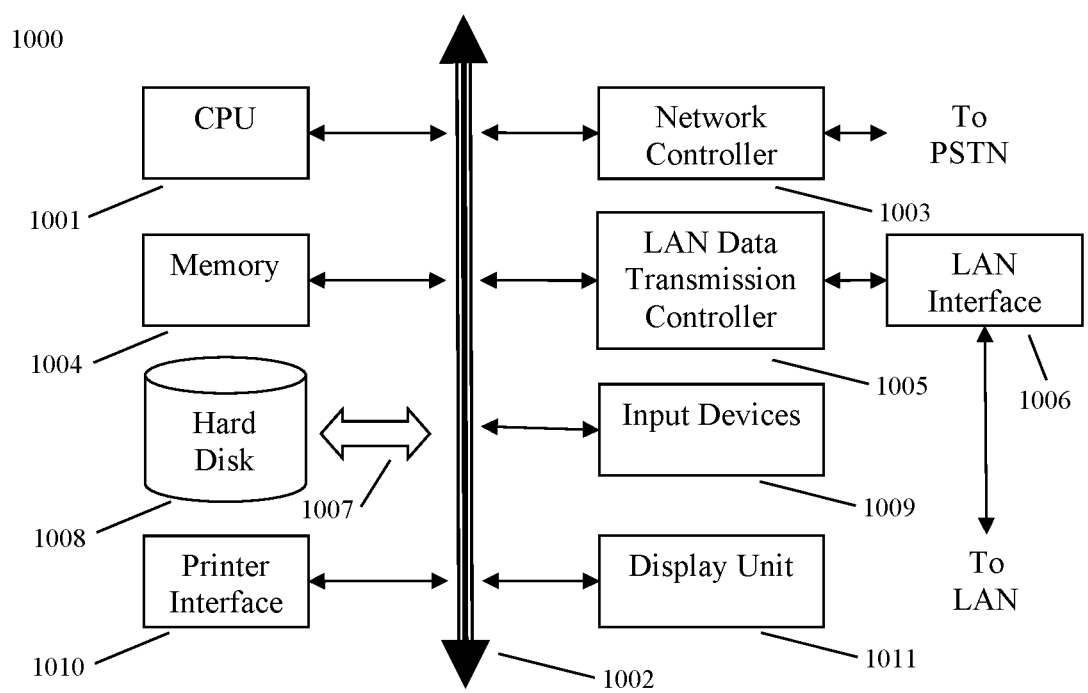
FIG. 16 shows an example of a computer system capable of implementing the method and apparatus according to embodiments of the present disclosure.

FIG. 16 shows an example of a computer system which may implement a method and system of the present disclosure. The system and method of the present disclosure may be implemented in the form of a software application running on a computer system, for example, a smartphone, a server, and/or a personal computer (PC), etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for revealing camouflaged components from an application running on a user device, comprising:

running the application on the user device, the application comprising a first sub-application and a second sub-application with the first sub-application being active and the second sub-application being camouflaged;

detecting, by the first sub-application, a human-machine interaction;

determining whether the detected human-machine interaction satisfies a predetermined condition;

activating the second sub-application when it is determined that the detected human-machine interaction satisfies the predetermined condition; and treating the detected human-machine interaction as a valid input for the operation of the first sub-application when it is determined that the human-machine interaction does not satisfy the predetermined condition, wherein the second sub-application provides a first feature of a sensitive nature that is not provided by the first sub-application.

2. The method of claim 1, wherein when it is determined that the detected human-machine interaction satisfies the predetermined condition and the second sub-application has been activated, the detected human-machine interaction is then treated as a valid input for the operation of the second sub-application.

3. The method of claim 1, wherein the first feature of the sensitive nature is adult-oriented or relates to sensitive financial or health information.

4. The method of claim 1, wherein the first sub-application is a web browser and the second sub-application is an application for participating in multiple live-streaming sessions or experiencing online videos across multiple platforms with a single consolidated user interface.

5. The method of claim 4, wherein the second sub-application is configured to reorganize an HTML element of the web page and add an interactive control to the web page, so as to obtain a layout of the multiple live-streaming sessions that is different from a standard rendering of the web page.

6. The method of claim 5, wherein reorganizing an HTML element includes shifting, swapping, adding, and/or subtracting a static HTML element while simultaneously rendering a video feed or another form of dynamic HTML element.

7. The method of claim 5, wherein the HTML element is a video streaming player and the reorganizing of the HTML element comprises at least one of the followings:

accessing a download link of a video file for the video streaming;

retrieving streaming data of the video streaming in real time; and regenerating a video flow by intercepting multiple frames of the video streaming when playing online.

8. The method of claim 1, wherein the first sub-application is a web browser and the second sub-application is a web browser with native support for participating in multiple live-streaming sessions or experiencing online videos with a single consolidated user interface.

9. The method of claim 1, wherein the application additionally comprises a third sub-application that is camouflaged upon the start of the running of the application on the user device and the determining whether the detected human-machine interaction satisfies a predetermined condition includes determining if the human-machine interaction satisfies a first predetermined condition for activating the second sub-application or satisfies a second predetermined condition for activating the third sub-application, wherein the third sub-application provides a second feature of a sensitive nature that is not provided by the first sub-application.

10. The method of claim 1, wherein the first sub-application is a web browser and the human-machine interaction comprises inputting a URL, wherein satisfying the predetermined condition includes the inputted URL being listed within a URL whitelist, wherein when the predetermined condition is not satisfied, the inputted URL is rendered by the first sub-application, and wherein when the predetermined condition is satisfied, the inputted URL is rendered by the second sub-application in a manner different from how the inputted URL would be rendered by the first sub-application.

11. The method of claim 1, wherein the human-machine interaction comprises connecting a user accessory to the user device by wired or wireless means.

12. The method of claim 1, wherein the human-machine interaction comprises scanning a two-dimensional code, the two-dimensional code being provided by a developer of the application.

13. The method of claim 12, wherein the two-dimensional code is a code printed on an accessory device or packaging for the accessory device that the second sub-application provides support for.

14. The method of claim 1, wherein the human-machine interaction comprises scanning an image of an accessory device that the second sub-application provides support for.

15. The method of claim 1, wherein the second sub-application automatically executes upon its activation or the execution of the second sub-application is manually initiated by the user after the activation of the second sub-application.

16. The method of claim 1, wherein the human-machine interaction includes a length of time that the first sub-application has been active for and the predetermined condition is when the length of time that the first sub-application has been active for exceeds a predetermined threshold.

17. A system for revealing camouflaged components from an application running on a user device, comprising:

a user device for:

running the application, the application comprising a first sub-application and a second sub-application with the first sub-application being active and the second sub-application being camouflaged;

detecting, by the first sub-application, a human-machine interaction;

determining whether the detected human-machine interaction satisfies a predetermined condition;

activating the second sub-application when it is determined that the detected human-machine interaction satisfies the predetermined condition; and treating the detected human-machine interaction as a valid input for the operation of the first sub-application when it is determined that the human-machine interaction does not satisfy the predetermined condition, wherein the second sub-application provides a first feature of a sensitive nature that is not provided by the first sub-application.

18. A computer system comprising:

a processor; and a non-transitory, tangible, program storage medium, readable by the computer system, embodying a program of instructions executable by the processor to perform method steps for revealing camouflaged components from an application running on a user device, the method comprising:

running the application on the user device, the application comprising a first sub-application and a second sub-application with the first sub-application being active and the second sub-application being camouflaged;

detecting, by the first sub-application, a human-machine interaction;

determining whether the detected human-machine interaction satisfies a predetermined condition;

activating the second sub-application when it is determined that the detected human-machine interaction satisfies the predetermined condition; and treating the detected human-machine interaction as a valid input for the operation of the first sub-application when it is determined that the human-machine interaction does not satisfy the predetermined condition, wherein the second sub-application provides a first feature of a sensitive nature that is not provided by the first sub-application.

19. The method of claim 1, wherein the second sub-application is both inactive and camouflaged prior to the determining whether the detected human-machine interaction satisfies a predetermined condition.

20. The method of claim 1, wherein the human-machine interaction that is determined to see if it satisfies a predetermined condition is a user instruction.

* * * * *